(12) United States Patent
Kato et al.

(10) Patent No.: US 11,326,545 B2
(45) Date of Patent: May 10, 2022

(54) INJECTION CONTROL DEVICE

(71) Applicant: DENSO CORPORATION, Kariya (JP)

(72) Inventors: Kosuke Kato, Kariya (JP); Yasumasa Ishikawa, Kariya (JP); Yohei Suganuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/333,207

(22) Filed: May 28, 2021

(65) Prior Publication Data

US 2021/0404411 A1    Dec. 30, 2021

(30) Foreign Application Priority Data

Jun. 29, 2020 (JP) .............................. JP2020-111598

(51) Int. Cl.
| | | |
|---|---|---|
| *F02D 41/40* | (2006.01) | |
| *F02D 41/14* | (2006.01) | |
| *F02D 41/20* | (2006.01) | |
| *F02D 41/22* | (2006.01) | |
| *F02D 41/24* | (2006.01) | |

(52) U.S. Cl.
CPC ......... *F02D 41/40* (2013.01); *F02D 41/1454* (2013.01); *F02D 41/20* (2013.01); *F02D 41/22* (2013.01); *F02D 41/2454* (2013.01); *F02D 2041/224* (2013.01)

(58) Field of Classification Search
CPC ...... F02D 41/14; F02D 41/1454; F02D 41/20; F02D 41/2013; F02D 41/2027; F02D 41/2034; F02D 41/2041; F02D 41/2058; F02D 41/22; F02D 41/221; F02D 41/24; F02D 41/2454; F02D 41/38

USPC ................. 701/102–105; 123/480, 488, 490
See application file for complete search history.

(56) References Cited

U.S. PATENT DOCUMENTS

| | | | | |
|---|---|---|---|---|
| 2014/0311459 | A1* | 10/2014 | Katsurahara | ............ F02D 41/30 123/478 |
| 2016/0363076 | A1* | 12/2016 | Kojima | .................... F02D 41/20 |
| 2017/0226950 | A1* | 8/2017 | Tanaka | .................... F02D 41/20 |
| 2019/0345889 | A1* | 11/2019 | Wakao | ................ F02D 41/1456 |
| 2020/0284214 | A1 | 9/2020 | Inaba et al. | |
| 2020/0309056 | A1* | 10/2020 | Fujisaki | .................. F02D 41/22 |
| 2021/0164414 | A1* | 6/2021 | Oki | ......................... F02D 41/20 |

FOREIGN PATENT DOCUMENTS

JP           2016-33343 A           3/2016

OTHER PUBLICATIONS

U.S. Appl. No. 17/333,126, filed May 28, 2021, Kato et al.
U.S. Appl. No. 17/333,088, filed May 28, 2021, Kato et al.

* cited by examiner

*Primary Examiner* — John Kwon
*Assistant Examiner* — Johnny H Hoang
(74) *Attorney, Agent, or Firm* — Posz Law Group, PLC (57) ABSTRACT

An injection control device includes: a fuel injection quantity command value output unit that outputs a command value for a fuel injection quantity of a fuel injection valve; a fuel injection quantity correction unit that calculates an air-fuel correction amount and corrects the command value for the fuel injection quantity; and a controller that executes current control on the fuel injection valve. The controller executes current area correction by calculating an area correction amount for an energization time. The injection control device further includes a learning controller that stops the air-fuel learning.

4 Claims, 4 Drawing Sheets

ND DEVICE

CROSS REFERENCE TO RELATED APPLICATION

The present application claims the benefit of priority from Japanese Patent Application No. 2020-111598 filed on Jun. 29, 2020. The entire disclosure of the above application is incorporated herein by reference.

TECHNICAL FIELD

The present disclosure relates to an injection control device that controls fuel injection to an internal combustion engine by current-driving a fuel injection valve.

BACKGROUND

In a comparative example, an injection control device is used to inject fuel into an internal combustion engine, such as an automobile engine, by opening and closing a fuel injection valve which is called an injector. The injection control device opens the fuel injection valve that is electrically drivable by passing current to the fuel injection valve. In recent years, due to tightening of PN regulations, micro-injection, that is, partial-lift injection has been frequently used. A high injection accuracy is required to improve fuel efficiency and reduce the amount of harmful substance emission. Thus, valve opening control is executed in such a manner that an energization current profile corresponding to a command injection quantity is set, and the injection control device supplies current to the fuel injection valve on the basis of the energization current profile.

SUMMARY

An injection control device includes: a fuel injection quantity command value output unit that outputs a command value for a fuel injection quantity of a fuel injection valve; a fuel injection quantity correction unit that calculates an air-fuel correction amount and corrects the command value for the fuel injection quantity; and a controller that executes current control on the fuel injection valve. The controller executes current area correction by calculating an area correction amount for an energization time. The injection control device further includes a learning controller that stops the air-fuel learning.

BRIEF DESCRIPTION OF THE DRAWINGS

The above and other features and advantages of the present disclosure will be more clearly understood from the following detailed description with reference to the accompanying drawings. In the accompanying drawings.

DETAILED DESCRIPTION

In controlling the fuel injection valve, the gradient of an energization current of the fuel injection valve may become lower than the gradient of the energization current profile due to various factors such as a peripheral temperature environment and aged deterioration, and an actual injection quantity may thus become lower than the command injection quantity. Since the fuel injection quantity is obtained corresponding to an integrated value of the energization current, in a comparative example technique, current area correction is executed in such a manner that the gradient of the energization current is detected by monitoring the current at driving of the fuel injection valve and an energization time is extended according to the detected gradient. The command injection quantity is calculated according to a load of the internal combustion engine or the like. At this time, it is desirable that an actual air-fuel ratio is detected in exhaust gas by an A/F sensor or the like and compared with a target air-fuel ratio, the feedback control is executed, and A/F learning is executed based on a history of A/F correction.

When a command value of the fuel injection quantity is output, the command value of the fuel injection quantity is corrected based on the A/F correction amount calculated using a feedback value of an air-fuel ratio and an A/F learning value. Here, in a case where current area correction is executed in an energization control of a fuel injection valve, when the area correction amount is relatively large and also the A/F correction amount is present at a lean side, there is a possibility that excessive correction is executed in the current area correction and an abnormal process of causing the fuel to be injected too much has executed. If the A/F learning is executed in this state, an abnormality that, in the current area correction, the area correction amount reaches an upper limit is detected. When the correction process is stopped, the A/F learning value is greatly moved to the lean side, and the fuel injection quantity after the movement may not be normally corrected.

Therefore, one example of the present disclosure provides an injection control device that executes current area correction based on an integrated value of an energization current in an energization control of a fuel injection valve and is capable of preliminarily preventing inappropriate A/F learning from being executed.

According to one example embodiment, an injection control device controls fuel injection by current-driving a fuel injection valve that supplies fuel to an internal combustion engine. The injection control device includes: a fuel injection quantity command value output unit that outputs a command value for a fuel injection quantity of the fuel injection valve; a fuel injection quantity correction unit that calculates an air-fuel correction amount based on a feedback correction value according to a difference between a detection air-fuel ratio of the internal combustion engine and a target air-fuel ratio and a learning value obtained by air-fuel ratio learning and corrects the command value of the fuel injection quantity; and a controller that executes current control on the fuel injection valve based on an energization current profile indicating a relationship between an energization time and an energization current value for obtaining an energization current integrated value corresponding to the fuel injection quantity command value. The controller executes current area correction by calculating, based on a difference between an integrated current value of the energization current profile and an integrated current value of a current flowing through the fuel injection valve detected by a current detector, an area correction amount for the energization time to cause the integrated current value of the energization current profile and the integrated current value of the current to be equal to each other. The injection control device further includes a learning controller that stops the air-fuel learning based on the area correction amount and the air-fuel correction amount.

According to the above configuration, in executing current control on the fuel injection valve, the controller executes the current area correction of calculating, on the basis of a difference between an integrated current value of the energization current profile and an integrated current value of the current that flows through the fuel injection valve and is detected by the current detector, the area correction amount for the energization time so that the integrated current values become equal to each other and executing correction. Thereby, it is possible to obtain the energization current integrated value for the fuel injection valve according to the fuel injection quantity command value, and thus the appropriate injection amount.

At this time, when the fuel injection quantity command value output unit outputs the command value, the fuel injection quantity command value output unit corrects the command value of the fuel injection quantity by calculating the A/F correction amount based on the learning value obtained by the feedback correction value according to the difference between the detection air-fuel ratio of the internal combustion engine and the target air-fuel ratio and the A/F learning. Thereby, it is possible to correct the command value of the fuel injection quantity by using the feedback correction value based on the current actual air-fuel ratio and the learning value based on the history of the A/F learning. Therefore, it is possible to execute a high accurate control.

Here, if the A/F learning is executed unconditionally, in a case where the excessive correction is executed in the current area correction and an abnormal process that injects the fuel too much is executed, it is conceivable that the correction value obtained by the A/F learning is greatly moved to the lean side, and the fuel injection quantity correction after the movement is not normally executed. However, since the learning controller stops the A/F learning based on the area correction amount and the A/F correction amount, it is possible to avoid executing the A/F learning based on the abnormal process as described above. Accordingly, in a case where, in the energization control of the fuel injection valve, the current area correction is executed based on the integrated value of the energization current, when the current area correction is executed excessively, it is possible to obtain an excellent effect of preliminarily preventing inappropriate learning of the A/F learning from being executed.

Figure 1:
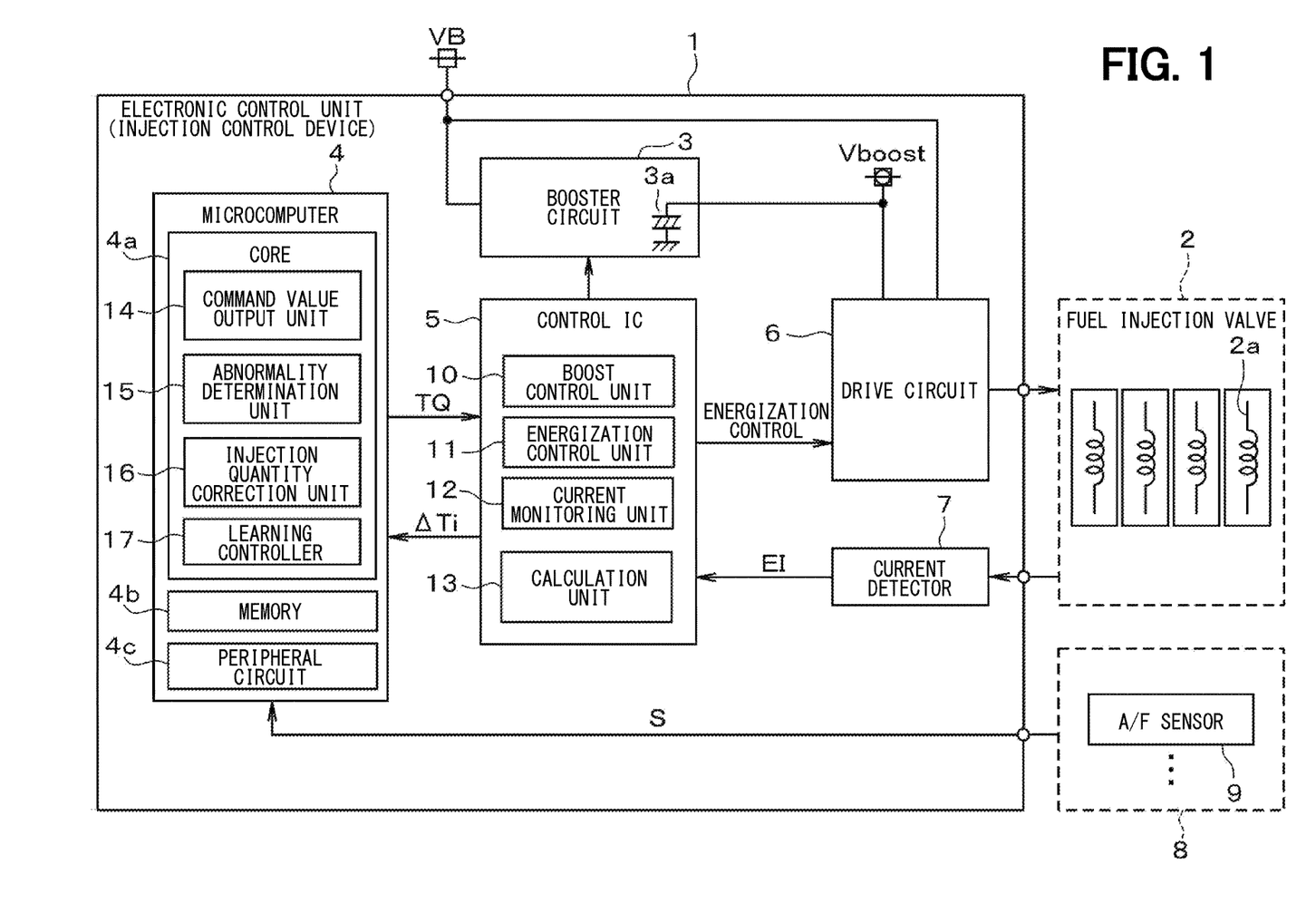
FIG. 1 is a block diagram illustrating the electrical configuration of an injection control device according to an embodiment.

Hereinafter, a present embodiment applied to direct-injection control for an automobile gasoline engine as an internal combustion engine will be described with reference to the drawings. An electronic control unit 1 serving as an injection control device according to the present embodiment is called an ECU (electronic control unit) and controls fuel injection of a fuel injection valve 2 mounted on each cylinder of an engine as illustrated in FIG. 1. The fuel injection valve 2 is also called an injector. The fuel injection valve 2 directly injects fuel into the corresponding cylinder of the engine by energizing a solenoid coil 2a to drive a needle valve. FIG. 1 illustrates an example of a four-cylinder engine. However, the present disclosure can also be applied to, for example, a three-cylinder engine, a six-cylinder engine, or an eight-cylinder engine. Alternatively, the present disclosure may also be applied to an injection control device for a diesel engine.

As illustrated in FIG. 1, the electronic control unit 1 has an electrical configuration including a booster circuit 3, a microcomputer 4, a control IC 5, a drive circuit 6, and a current detector 7. The microcomputer 4 includes one or more cores 4a, a memory 4b such as a ROM and a RAM, and a peripheral circuit 4c such as an A/D converter. Sensor signals S from various sensors 8 for detecting the operating state of the engine are input to the microcomputer 4. As described later, the microcomputer 4 obtains a command value for a fuel injection quantity on the basis of, for example, a program stored in the memory 4b and the sensor signals S acquired from the various sensors 8. The control IC may be also referred to as a controller 5.

At this time, the various sensors 8 include an A/F(air-fuel) sensor 9 which is disposed on an exhaust path of the engine to detect an air-fuel ratio of exhaust gas. Although not illustrated, in addition to the A/F sensor 9, the various sensors 8 include, for example, a water temperature sensor which detects the temperature of an engine cooling water, a crank angle sensor which detects a crank angle of the engine, an air flow meter which detects the amount of intake air of the engine, a fuel pressure sensor which detects the pressure of fuel injected into the engine, and a throttle opening sensor which detects a throttle opening. FIG. 1 illustrates the sensors 8 in a simplified manner.

A core 4a of the microcomputer 4 implements functions of a fuel injection quantity command value output unit 14, an area correction abnormality determination unit 15, a fuel injection quantity correction unit 16, and a learning controller 17. Among these units, the fuel injection quantity command value output unit 14 grasps an engine load from the sensor signals S of the various sensors 8, calculates a fuel injection quantity required for the fuel injection valve 2 on the basis of the engine load, and outputs, to the control IC 5, the calculated fuel injection quantity as a fuel injection quantity command value TQ together with injection start instruction time t0. Details of the area correction abnormality determination unit 15 will be described later. In FIG. 1, the fuel injection quantity command value output unit 14 may be referred to as "COMMAND VALUE OUTPUT UNIT", the rea correction abnormality determination unit 15 may be referred to as "ABNORMALITY DETERMINATION UNIT", and the fuel injection quantity correction unit 16 may be referred to as "INJECTION QUANTITY CORRECTION UNIT".

At this time, as will be described later in description of actions, the fuel injection quantity correction unit 16 calculates, on the basis of the air-fuel ratio detected by the A/F sensor 9, a feedback correction value so that the air-fuel ratio is equal to a target air-fuel ratio. Additionally, the learning accumulated and stored in the past A/F learning history is added to the feedback correction value, an A/F correction amount CV is calculated, and a fuel injection quantity command value TQ is corrected. Thereby, the air-fuel ratio feedback control is executed using the A/F correction amount CV regarding the fuel injection quantity command value TQ.

The learning controller 17 controls A/F learning. This A/F learning learns the relationship between a required injection amount with an individual difference of the fuel injection valve 2 and an actual air-fuel ratio detected by the A/F sensor 9, and stores, as a learning value, a difference between a target air-fuel ratio and the actual air-fuel ratio for each of multiple parameters of a driving state such as, for example, an engine speed or a cooling water temperature. As described later, the learning controller 17 implements a function of stopping the A/F learning based on an area correction amount $\Delta Ti$ and the A/F correction amount CV.

The control IC 5 is an integrated circuit device such as an ASPIC. Although not illustrated, the control IC 5 includes, for example, a logic circuit, a control main body such as a CPU, a storage unit such as a RAM, a ROM, or an EEPROM, and a comparison unit such as a comparator, or the like. The control IC 5 executes current control or the like on the fuel injection valve 2 through the drive circuit 6 using hardware and software configurations thereof. At this time, as described below, the control IC 5 has functions of a boost control unit 10, an energization control unit 11, a current monitoring unit 12, and an area correction amount calculation unit 13. In FIG. 1, the area correction amount calculation unit 13 may be referred to as "CALCULATION UNIT".

Although not illustrated in detail, a battery voltage VB is input to the booster circuit 3, and the booster circuit 3 boosts the battery voltage VB and charges a booster capacitor 3a serving as a charging unit with boost voltage Vboost. At this time, the boost control unit 10 controls the operation of the booster circuit 3 to boost the input battery voltage VB and charge the booster capacitor 3a with the boost voltage Vboost up to a full charge voltage. The boost voltage Vboost is supplied to the drive circuit 6 as power for driving the fuel injection valve 2.

The battery voltage VB and the boost voltage Vboost are input to the drive circuit 6. Although not illustrated, the drive circuit 6 includes a transistor for applying the boost voltage Vboost to the solenoid coil 2a of the fuel injection valve 2 of each cylinder, a transistor for applying the battery voltage VB to the solenoid coil 2a, and a cylinder selection transistor which selects the cylinder to be energized, or the like. At this time, each of the transistors of the drive circuit 6 is turned on and off by the energization control unit 11. Accordingly, the drive circuit 6 drives the fuel injection valve 2 by applying the voltage to the solenoid coil 2a in accordance with energization control of the energization control unit 11.

The current detector 7 includes, for example, a current detection resistor (not illustrated) and detects a current flowing through the solenoid coil 2a. The current monitoring unit 12 of the control IC 5 includes a comparator and an A/D converter (both of which are not illustrated), or the like. The current monitoring unit 12 monitors, through the current detector 7, an energization current value EI which is a value of the current actually flowing through the solenoid coil 2a of the fuel injection valve 2 of each cylinder.

An energization current profile PI is stored in the control IC 5. The energization current profile PI indicates an ideal relationship between an energization time Ti and the energization current value for obtaining an energization current integrated value of the fuel injection valve 2 corresponding to the fuel injection quantity command value TQ. The energization control unit 11 of the control IC 5 executes current control on the fuel injection valve 2 through the drive circuit 6 on the basis of the energization current profile PI. At this time, in controlling the fuel injection valve 2, the gradient of the energization current of the fuel injection valve 2 may become lower than the gradient of the energization current profile PI due to various factors such as a peripheral temperature environment and aged deterioration, and an actual injection quantity may thus become lower than the command injection quantity. On the other hand, in controlling energization of the fuel injection valve 2, a fuel injection quantity corresponding to, that is, proportional to the integrated value of the energization current.

Thus, the energization control unit 11 executes, on the basis of the difference between an integrated current value of the energization current profile PI and an integrated current value of the energization current value EI, which is the value of the current actually flowing through the fuel injection valve 2, detected by the current detector 7, current area correction by calculating an area correction amount $\Delta Ti$ for the energization time so as to make the integrated current values equal to each other. Current area correction control executed by the energization control unit 11 of the control IC 5 at partial-lift injection of the fuel injection valve 2 will be briefly described with reference to FIG. 2.

In the control based on the energization current profile PI, when energization is started at ON timing t0, the energization current gradually increases in a slight curve and reaches a peak current Ipk at time ta through energization for the energization time Ti, and a fuel injection quantity corresponding to the fuel injection quantity command value TQ is obtained. However, the actual energization current value EI of the fuel injection valve 2 increases in a curve with a gentler gradient than the curve in the energization current profile PI and reaches a current value lower than the peak current Ipk at the time ta. Thus, there is a shortage of the fuel injection quantity by a quantity corresponding to the difference between the integrated current value of the energization current profile PI and the integrated current value of the energization current value EI, in other words, the area in the graph between the curve of the energization current profile PI and the curve of the energization current value EI from the time t0 to the time ta in FIG. 2, that is, a quantity corresponding to an area difference A1.

In the current area correction control, the area correction amount calculation unit 13 calculates an area correction amount $\Delta Ti$ for the energization time. The area correction amount $\Delta Ti$ is determined so that the integrated current value of the energization current profile PI and the integrated current value of the energization current value EI become equal to each other, that is, the area difference A1 and an area A2 in FIG. 2 become equal to each other. Then, the energization control unit 11 corrects, that is, extends the energization time using the calculated area correction amount $\Delta Ti$, thereby compensating for the shortage of the fuel injection quantity described above.

For example, the following method can be used as a method for calculating the area correction amount $\Delta Ti$. First, time t1n to reach a first current threshold I1 and time t2n to reach a second current threshold I2 for the energization current profile PI, and time t1 to reach the first current threshold I1 and time t2 to reach the second current threshold I2 for the energization current value EI are obtained. Then, the area difference A1 is estimated from these time values, and the area correction amount $\Delta Ti$ for obtaining the area A2 equal to the area difference A1 is calculated. An appropriate fuel injection quantity of the fuel injection valve 2 corresponding to the fuel injection quantity command value TQ can be obtained by executing such current area correction control. As illustrated in FIG. 1, the area correction amount $\Delta Ti$ is input to the microcomputer 4 from the area correction amount calculation unit 13.

As described above, the microcomputer 4 has the function of the area correction abnormality determination unit 15 which determines that an area correction abnormality is present when the area correction amount $\Delta Ti$ is equal to or larger than an abnormality determination value TML. The abnormality determination value TML is set to, for example, 110 µs. When the area correction abnormality determination unit 15 determines the area correction abnormality, the microcomputer 4 outputs the current area correction stop command to the control IC 5, and the current area correction is stopped. In the present embodiment, the learning controller 17 stops the A/F learning based on the above area correction amount $\Delta Ti$ and the A/F correction amount CV.

Figure 3:
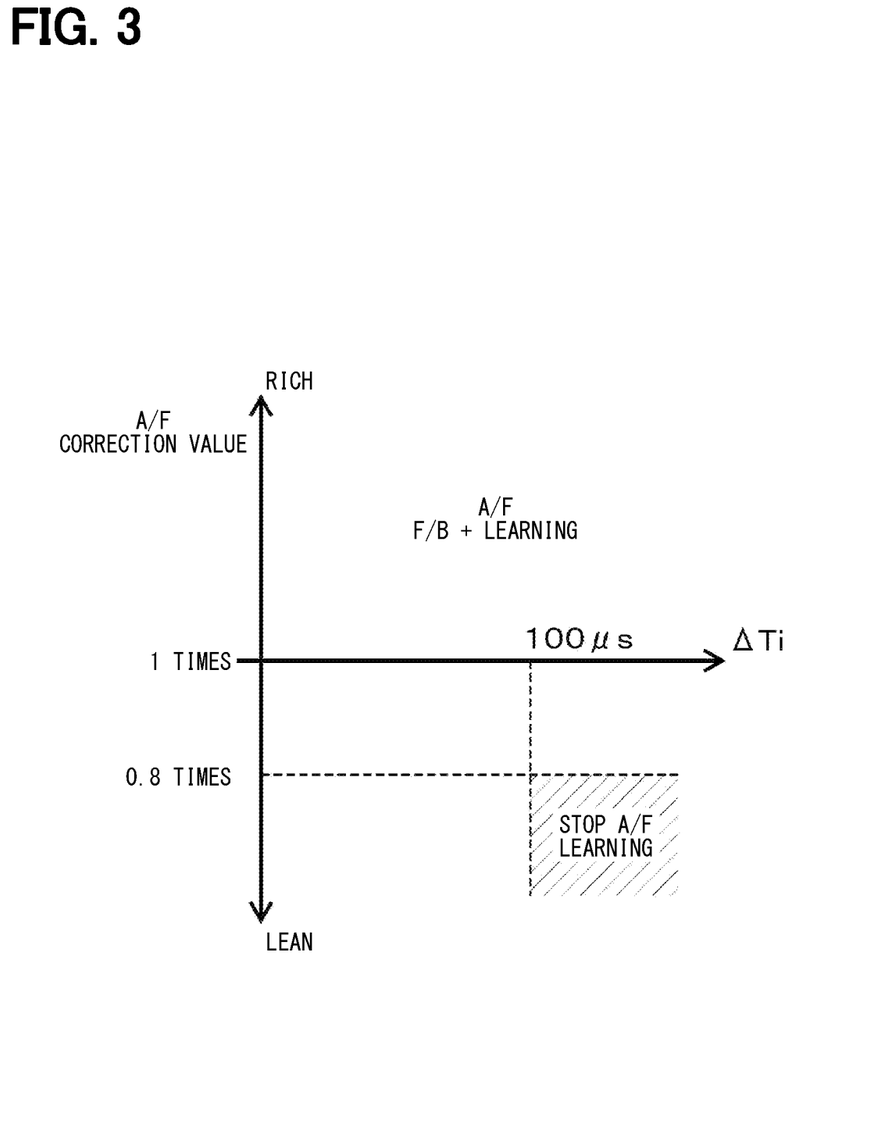
FIG. 3 is a diagram for describing a stop condition of A/F learning.

FIG. 3 shows a specific example of a condition for stopping the A/F learning of the area correction amount ΔTi and the A/F correction amount CV in the present embodiment. As shown in FIG. 3, the learning controller 17 stops the A/F learning when the area correction amount ΔTi is equal to or more than a predetermined value PV and also the A/F correction amount CV is less than a threshold SL, that is, is present at the lean side. At this time, when the air-fuel ratio is equal to a stoichiometric value serving as a target air-fuel ratio, for example, 14.7, the A/F correction amount CV is set to 1 times. When the A/F correction amount CV is equal to or larger than the value set to 1 times, the A/F correction amount CV is present at a rich side. When the A/F correction amount CV is smaller than the value set to 1 times, the A/F correction amount CV is present at a lean side and the threshold SL is set to, for example, 0.8 times. The predetermined value PV is set to be smaller than the abnormality determination value TML, and is set to, for example, 100 μs.

When the learning controller 17 stops the A/F learning, the fuel injection quantity correction unit 16 calculates, as the A/F correction amount CV, the feedback correction value so as to obtain the target air-fuel ratio based on the air-fuel ratio detected by the A/F sensor 9 without using the learning value, and the fuel injection quantity command value TQ is corrected. Under other conditions, as described above, the fuel injection quantity correction unit 16 adds the learning value to the feedback correction value and calculates the A/F correction amount CV, and fuel injection quantity command value TQ is corrected.

Figure 2:
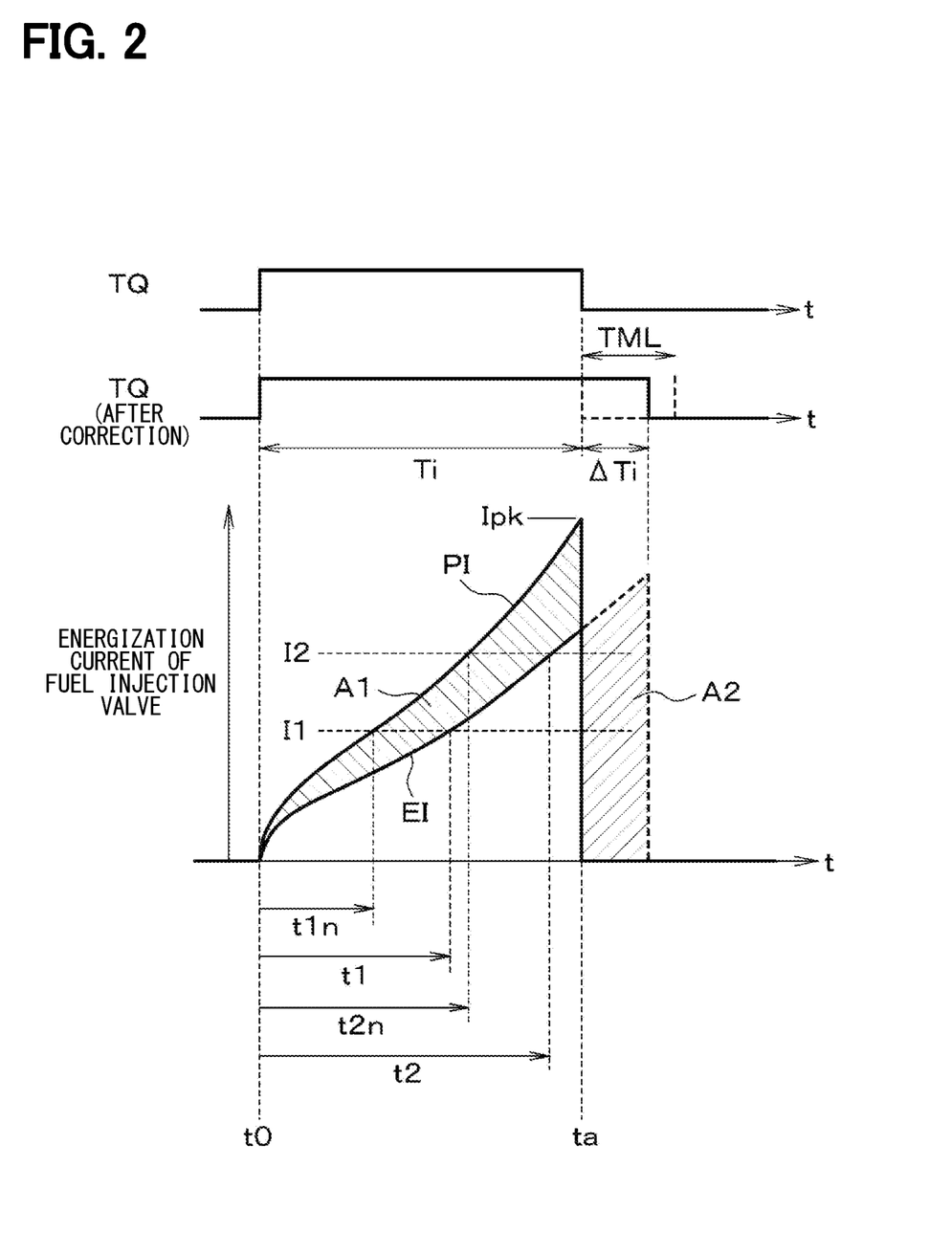
FIG. 2 is a diagram for describing current area correction control, illustrating the relationship between an energization time and an energization current of a fuel injection valve.

Next, actions and effects in the electronic control unit 1 configured in the above manner will be described with reference to FIG. 4 in addition. The electronic control unit 1 described above executes the current area correction control using the fact that the fuel injection quantity corresponding to the integrated value of the energization current of the fuel injection valve 2 can be obtained in current control on the fuel injection valve 2 executed by the microcomputer 4 and the control IC 5. As illustrated in FIG. 2, in the current area correction control, the current area correction is executed by calculating, on the basis of the difference between the integrated current value of the energization current profile PI and the integrated current value of the energization current value EI, which is the value of the current flowing through the fuel injection valve 2, detected by the current detector 7, an area correction amount ΔTi for the energization time so that the integrated current values become equal to each other.

In this case, typically, the gradient of the actual current value EI detected by the current detector 7 is deviated from an ideal gradient of the energization current indicated by the energization current profile PI in a decreasing direction. Thus, the current area correction as described above makes it possible to compensate for the shortage of the actual energization current integrated value, that is, the fuel injection quantity of the fuel injection valve 2 corresponding to the fuel injection quantity command value TQ and thus obtain an appropriate fuel injection quantity. At this time, in the present embodiment, the area correction abnormality determination unit 15 makes it possible to determine that an area correction abnormality is present when the area correction amount ΔTi is equal to or larger than the abnormality determination value TML. When it is determined that the area correction abnormality is present, the current area correction is stopped.

On the other hand, in the present embodiment, with respect to the fuel injection quantity command value TQ, the microcomputer 4 calculates the feedback correction value so that the air-fuel ratio is equal to the target air-fuel ratio base on the actual air-fuel ratio detected by the A/F sensor 9. The learning value accumulated and stored in the past A/F learning history is added to the feedback correction value, the A/F correction amount CV is calculated, and the fuel injection quantity command value TQ is corrected. Thereby, it is possible to correct the command value TQ of the fuel injection quantity by using the feedback correction value based on the current actual air-fuel ratio and the learning value based on the history of the A/F learning. Therefore, it is possible to execute a high accurate control.

Figure 4:
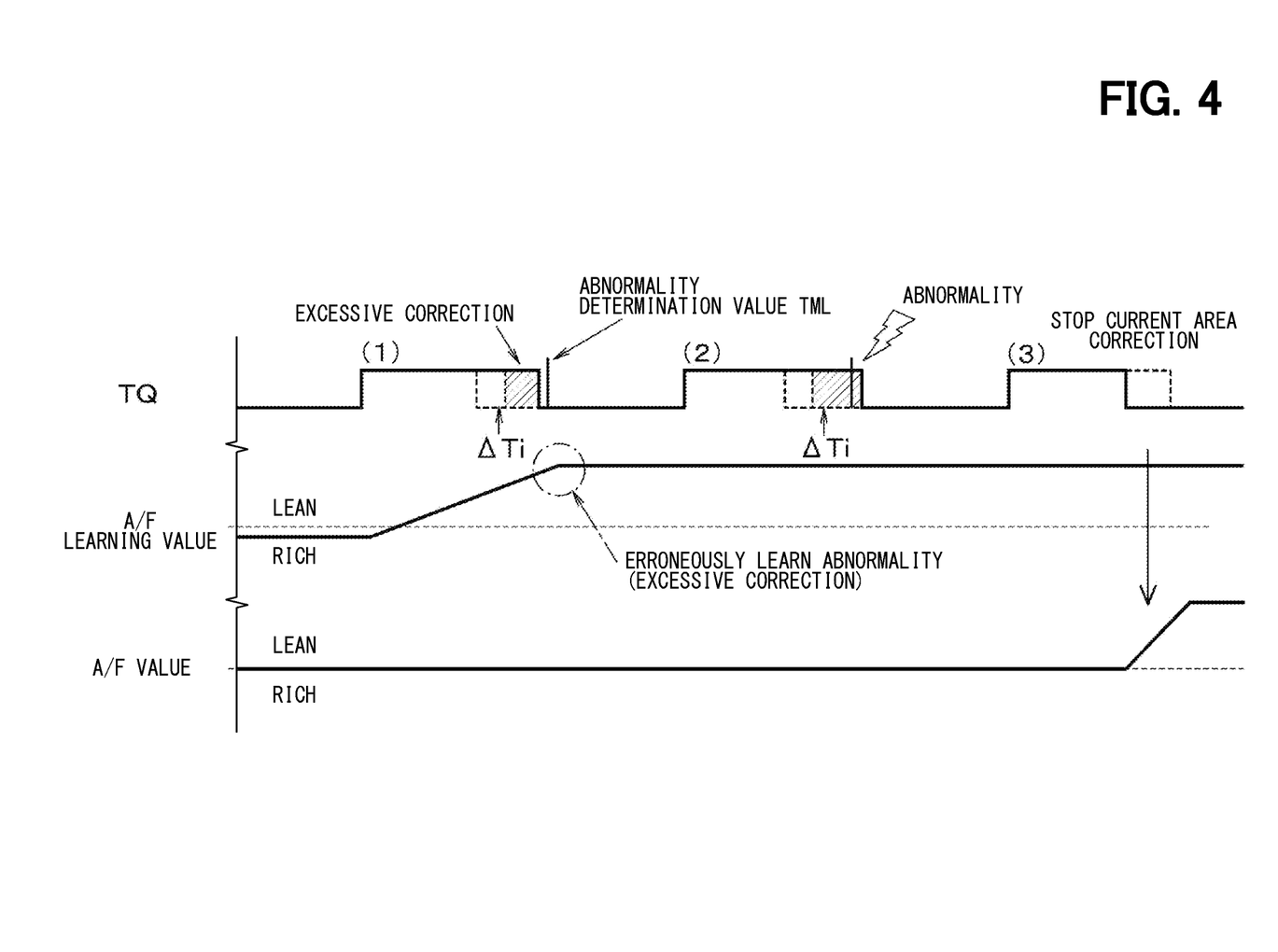
FIG. 4 is a diagram illustrating a state of area correction abnormality determination using an A/F value and a learning value in a case of erroneous learning.

Here, as illustrated in FIG. 4, it is conceivable that, in the current area correction at a first fuel injection time (1) of FIG. 4, some abnormality occurs, the area correction amount ΔTi becomes relatively large, and the excessive correction of excessively injecting the fuel is executed. At this time, if the A/F learning is executed unconditionally, in a case where the abnormal process of injecting the fuel too much is executed, the correction value in the A/F learning is greatly changed to the lean side, and the erroneous learning may be executed. When such as erroneous learning is executed, at the next fuel injection time (2), the area correction amount ΔTi becomes larger and exceeds the abnormality determination value TML, and the fuel injection quantity correction after a fuel injection time (3) is not normally executed. That is, it is conceivable that the injection amount becomes insufficient.

However, in the present embodiment, the learning controller 17 has a function of stopping the A/F learning based on the area correction amount ΔTi and the A/F correction amount CV. Specifically, as shown in FIG. 3, it is possible to avoid the A/F learning when the area correction amount ΔTi is equal to or more than the predetermined value PV, for example, 100 μs and also the A/F correction amount CV is less than a threshold SL corresponding to 0.8 times and is present at the lean side. Thereby, when, in the current area correction control, the abnormality process occurs and the area correction amount ΔTi becomes close to the abnormality determination value TML, the A/F learning is stopped. It is possible to preliminarily prevent the failure as described above.

In such a manner, in the present embodiment, the feedback correction value is calculated so that the air-fuel ratio is equal to the target air-fuel ratio based on the actual air-fuel ratio detected by the A/F sensor 9. The learning value accumulated and stored in the past A/F learning history. The fuel injection quantity correction unit 16 corrects the fuel injection quantity command value TQ, and the learning controller 17 stops the A/F learning based on the area correction amount ΔTi and the A/F correction amount CV. Accordingly, in a case where, in the energization control of the fuel injection valve 2, the current area correction is executed based on the integrated value of the energization current, when the current area correction is executed excessively, it is possible to obtain an excellent effect of preliminarily preventing inappropriate A/F learning from being executed.

Then, the learning controller 17 stops the A/F learning when the area correction amount ΔTi is equal to or more than a predetermined value PV and also the A/F correction amount CV is less than a threshold SL, that is, is present at the lean side. Thereby, when the area correction amount ΔTi is relatively large and the A/F correction amount CV is present at the lean side, the excessive correction is executed even in the current area correction and the abnormal process of injecting the fuel too much may be executed. In such a case, the controller 17 can preliminarily prevent inappropriate A/F learning from being executed.

In particular, the present embodiment includes the area correction abnormality determination unit 15 that determines the area correction abnormality when the area correction amount ΔTi is equal to or more than the abnormality determination value TML. The predetermined value PV as the condition for stopping the A/F learning is set to a value smaller than the abnormality determination value TML. As the result, by providing the area correction abnormality determination unit 15, it is possible to determine the area correction abnormality when the area correction amount ΔTi is equal to or more than the abnormality determination value. At this time, since the predetermined value PV is set to the value smaller than the area correction amount ΔTi, in a case where the excessive correction is executed in the current area correction, the learning stop by the learning controller 17 is prioritized before the area correction abnormality determination unit 15 executes the abnormality determination. Thereby, it is possible to appropriately execute both of the learning stop by the learning controller 17 and the abnormality determination by the area correction abnormality determination unit 15.

In executing the area correction control on the fuel injection valve 2, the above embodiment employs a relatively simple method in which the time t1$n$ to reach the first current threshold I1 and the time t2$n$ to reach the second current threshold I2 for the energization current profile P1, and the time t1 to reach the first current threshold I1 and the time t2 to reach the second current threshold I2 for the actual energization current value EI are obtained, and the area difference A1 is then estimated from these time values. However, the area correction amount ΔTi may be obtained by employing other various methods. In the specific example of the condition for stopping the A/F learning, the above embodiment sets the predetermined value PV to, for example, 100 μs and sets the threshold SL to, for example, 0.8 times. However, these numerical values are examples, and may be appropriately changed.

The microcomputer 4 and the control IC 5 described above may be integrated with each other. In this case, it is desirable to use an arithmetic processor capable of executing a high-speed operation. The means and the functions provided by the microcomputer 4 and the control IC 5 can be provided by software recorded in a substantive memory device and a computer executing the software, software only, hardware only, or a combination thereof. For example, when the control device is provided by an electronic circuit as hardware, the control device can include a digital circuit including one or more logic circuits or an analog circuit. Further, for example, when the control device executes various control operations using software, a program is stored in the storage unit, and the control main body executes the program to implement a method corresponding to the program.

In addition, the hardware configuration such as the fuel injection valve, the booster circuit, the drive circuit, and the current detector can be variously modified. The present disclosure has been described in accordance with the embodiment. However, it is to be understood that the present disclosure is not limited to the embodiment and structure. The present disclosure includes various modifications and modifications within the equivalent range. In addition, various combinations and modes, as well as other combinations and modes including only one element, more, or less, are within the scope and idea of the present disclosure.

The controller (control unit) and the method described in the present disclosure may be implemented by a dedicated computer including a processor programmed to execute one or more functions embodied by a computer program and a memory. Alternatively, the controller and the method described in the present disclosure may be implemented by a dedicated computer including a processor including one or more dedicated hardware logic circuits. Alternatively, the controller and the method described in the present disclosure may be implemented by one or more dedicated computers including the combination of a processor programmed to execute one or more functions and a memory and a processor including one or more hardware logic circuits. The computer program may be stored, as an instruction executed by a computer, in a computer-readable non-transitory tangible storage medium.

The invention claimed is:

1. An injection control device configured to control fuel injection by current-driving a fuel injection valve configured to supply fuel to an internal combustion engine, the injection control device comprising:
   a fuel injection quantity command value output unit configured to output a command value for a fuel injection quantity of the fuel injection valve;
   a fuel injection quantity correction unit configured to calculate an air-fuel correction amount based on a feedback correction value according to a difference between a detection air-fuel ratio of the internal combustion engine and a target air-fuel ratio and a learning value obtained by air-fuel ratio learning and correct the command value for the fuel injection quantity; and
   a controller configured to execute current control on the fuel injection valve based on an energization current profile indicating a relationship between an energization time and an energization current value for obtaining an energization current integrated value corresponding to the fuel injection quantity command value,
   wherein:
   the controller is configured to execute current area correction by calculating, based on a difference between an integrated current value of the energization current profile and an integrated current value of a current that flows through the fuel injection valve and is detected by a current detector, an area correction amount for the energization time to cause the integrated current value of the energization current profile and the integrated current value of the current to be equal to each other; and
   the injection control device further comprises a learning controller configured to stop the air-fuel learning based on the area correction amount and the air-fuel correction amount.

2. The fuel injection device according to claim 1, wherein:
   the learning controller stops the air-fuel learning when the area correction amount is equal to or more than a predetermined value and when the air-fuel correction amount is less than a threshold and is present at a lean side.

3. The fuel injection device according to claim 2, further comprising:
   an area correction abnormality determination unit configured to determine an area correction abnormality when the area correction amount is equal to or more than an abnormality determination value,
   wherein:

the predetermined value is less than the abnormality determination value.

4. An injection control device comprising:

a processor; and a memory that stores an instruction configured to, when executed by the processor, cause the processor to:
- control fuel injection by current-driving a fuel injection valve configured to supply fuel to an internal combustion engine;
- output a command value for a fuel injection quantity of the fuel injection valve;
- calculate an air-fuel correction amount based on a feedback correction value according to a difference between a detection air-fuel ratio of the internal combustion engine and a target air-fuel ratio and a learning value obtained by air-fuel ratio learning and correct the command value for the fuel injection quantity;
- execute current control on the fuel injection valve based on an energization current profile indicating a relationship between an energization time and an energization current value for obtaining an energization current integrated value corresponding to the fuel injection quantity command value;
- execute current area correction by calculating, based on a difference between an integrated current value of the energization current profile and an integrated current value of a current that flows through the fuel injection valve and is detected, an area correction amount for the energization time to cause the integrated current value of the energization current profile and the integrated current value of the current to be equal to each other; and
- stop the air-fuel learning based on the area correction amount and the air-fuel correction amount.

* * * * *